K. Goddard.
Horse Shoe.

N° 90,442. Patented May 25, 1869.

Witnesses.
A. W. Almquist
O. Hindman

Inventor
Rev K. Goddard
Per Munn & Co
Attys.

United States Patent Office.

KINGSTON GODDARD, OF RICHMOND, NEW YORK.

Letters Patent No. 90,442, dated May 25, 1869.

---

IMPROVEMENT IN DETACHABLE CALKS FOR HORSESHOES.

---

The Schedule referred to in these Letters Patent and making part of the same.

---

*To all whom it may concern:*

Be it known that I, KINGSTON GODDARD, of Richmond, in the county of Richmond, and State of New York, have invented a new and improved Detachable Calk for Horseshoes; and I do hereby declare that the following is a full, clear, and exact description thereof, which will enable others skilled in the art to make and use the same, reference being had to the accompanying drawings, forming a part of this specification, in which—

Similar etters of reference indicate corresponding parts.

My invention has for its object to furnish an improved horseshoe-calk, which shall be so constructed and arranged that it may be conveniently attached when required for use, and as conveniently detached when no longer required; and It consists in the calk, constructed and secured to the horseshoe in the manner hereinafter more fully described.

A represents a horseshoe, which is constructed and secured to the horse's foot in the ordinary manner.

Figure 1:
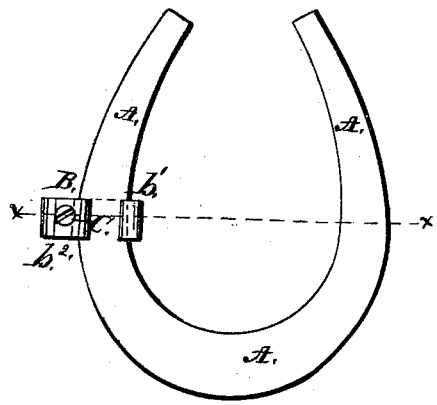
Figure 1 is a top view of a horseshoe to which my improved calk has been attached.
Figure 2:
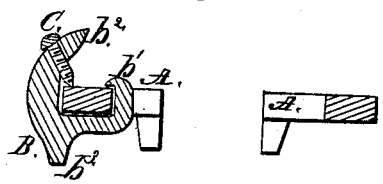
Figure 2 is a detail sectional view of the same, taken through the line $x\,x$, fig. 1.

B is the calk, which is made to fit upon the body of the shoe, as shown in figs. 1 and 2.

The inner or hooked upper arm, $b^1$, of the calk B, hooks over the inner upper edge of the shoe A, and the outer upper arm, $b^2$, of the said calk extends up along the outer edge of the shoe, and along the outer side of the horse's hoof, being so formed upon its inner side, that the calk may be placed upon and removed from the shoe A, while the said shoe is fast upon the horse's foot.

The calk B is secured in place upon the shoe A by the screw C, which passes through the arm $b^2$ of the calk B, in a downwardly-inclined direction, so that its point or forward end may come in contact with the outer edge of the upper side of the shoe A, as shown in fig. 2, so as to securely fasten the calk to the shoe, the said screw being made of such a length that its head will project very little, if at all, upon the outer side of the arm $b^2$.

Upon the lower side of the calk B is formed the arm, or calk, $b^3$, that comes in contact with the ground.

The calk $b^3$ may be formed upon the outer part of the lower side of the calk B, as shown in fig. 2, or it may be formed further inward, so as to be directly beneath the body of the shoe A. This latter position I prefer, as more firmly supporting the horse's foot.

When no longer required, the calks B can be readily detached, by simply turning out the screw C.

Having thus described my invention,

I claim as new, and desire to secure by Letters Patent—

The detachable calk B, constructed and secured to the shoe A, substantially in the manner shown and described, and for the purpose set forth.

The above specification of my invention signed by me, this 19th day of April, 1869.

KINGSTON GODDARD.

Witnesses:
FRANK BLOCKLEY,
JAMES T. GRAHAM.